United States Patent
Bitar et al.

(10) Patent No.: US 7,304,944 B2
(45) Date of Patent: Dec. 4, 2007

(54) UNIFIED SCHEDULING AND QUEUEING ARCHITECTURE FOR A MULTISERVICE SWITCH

(75) Inventors: Nabil N. Bitar, Winchester, MA (US); Philip To, Burlington, MA (US); Thomas A. Hoch, Boxborough, MA (US)

(73) Assignee: Lucent Technologies Inc., Murray Hill, NJ (US)

( * ) Notice: Subject to any disclaimer, the term of this patent is extended or adjusted under 35 U.S.C. 154(b) by 759 days.

(21) Appl. No.: 10/838,788

(22) Filed: May 3, 2004

(65) Prior Publication Data

US 2005/0243853 A1 Nov. 3, 2005

(51) Int. Cl.
*H04J 1/16* (2006.01)

(52) U.S. Cl. .................. 370/229; 370/235; 370/395.43

(58) Field of Classification Search ............... 370/229, 370/230, 230.1, 231, 232, 233, 234, 235, 370/235.1, 237, 413, 389, 395.1, 395.43, 370/395.42
See application file for complete search history.

(56) References Cited

U.S. PATENT DOCUMENTS

| 6,169,748 B1 * | 1/2001 | Barbas et al. ............... 370/468 |
| 7,016,366 B2 * | 3/2006 | Kawarai et al. ............ 370/413 |

* cited by examiner

*Primary Examiner*—Chi Pham
*Assistant Examiner*—Alexander O. Boakye

(57) ABSTRACT

The present invention provides hierarchical structures of queues and schedulers for switches and routers with, preferably fully-connected, mesh fabrics, for efficiently and properly handling the quality or service requirements of multiple network services, such as ATM and IP, in switch or router. The switches of this invention provide, for example, fair allocation of bandwidths to different network services, to different QoS classes within network services, and to different resources within the switch by use of, preferably, weighted, fair scheduling methods. The switches and routers of this invention are particularly directed to multi-protocol, high-throughput communication application, but may have wide applicability in systems generally where data packets are switched or routed.

26 Claims, 6 Drawing Sheets

UNIFIED SCHEDULING AND QUEUEING ARCHITECTURE FOR A MULTISERVICE SWITCH

This application incorporates by reference in their entireties and for all purposes the following patent applications, all of which are owned or subject to a right of assignment to the assignee of the present application and all of which were filed concurrently together with the present application: (1) the application titled "SYSTEMS AND METHODS IMPLEMENTING 1+1 AND N:1 LINE CARD REDUNDANCY", by Bitar et al. and identified by (Ser. No. 10/838,781) (hereafter, the "Redundancy application"); (2) the application titled "METHODS AND SYSTEMS FOR EFFICIENT MULTICAST ACROSS A MESH BACKPLANE", by Bitar et al. and identified by (Ser. No. 10/838,782) (hereafter, the "Multicast application"); (3) the application titled "VARIABLE PACKET-SIZE BACKPLANES FOR SWITCHING AND ROUTING SYSTEMS", by Bitar et al. and identified by (Ser. No. 10/838,780) (hereafter, the "Variably-sized FDU application"); and (4) the application titled "SYSTEMS AND METHODS FOR SMOOTH AND EFFICIENT ROUNG-ROBIN SCHEDULING", by Bitar et al. and identified by (Ser. No. 10/838,778) (hereafter, the "SEWDRR application").

FIELD OF INVENTION

The present invention relates generally to communications networks, and more particularly to packet scheduling in switching and routing devices. In particular, it addresses the design of multi-service switch/router backplanes that provide for both reserved and unreserved traffic of which ATM and IP, respectively, are representatives.

BACKGROUND OF THE INVENTION

Today's multi-service switch/router system (also referred to herein as a network element (NE)) often handles communications packets of two or more different services or protocols, such as asynchronous transfer mode (ATM), frame relay (FR), internet protocol (IP), multi-protocol label switching (MPLS), Ethernet, and so forth. For example, IP packets may be routed between two packet-over-SONET (POS) network ports while ATM cells are simultaneously switched between two ATM network ports. The ATM and IP POS network ports may even be sharing the same line interface card and the same thread through the switch fabric thread (or router data backplane). However, multi-service or multi-protocol operation of prior art NEs leads to problems due often to the heterogeneous characteristics of modern services and protocols.

This heterogeneity is illustrated by comparing IP packet to ATM cell traffic. First, IP does not require advance setup of a connection between a source-destination pair. Instead, each packet is independently and non-deterministically routed from its source to its destination, routing decisions being made moment-to-moment by the individual NEs. Thus, the traffic flow within an IP network, or even within the NEs in an IP network is not known in advance, and can significantly shift due to failures in the network, administrative changes, or the like. Further, IP does not reserve network resources, and packets flowing between one source-destination pair compete for resources with packets of other flows. But despite being non-deterministic and non-reserved, IP does have quality of service (QoS) expectations for different types of traffic.

In contrast, ATM requires advance setup of a connection between a source-destination pair and reserves network resources prior to commencing cell traffic between the pair. The connection establishes the deterministic path that all cells will follow between the source-destination pair, and therefore prescribes in advance the routing through the NEs in the traffic path. Thus, unlike IP, the amount of ATM traffic over network paths is known in advance. Accordingly, the network can reserve to a source-destination pair resources sufficient to meet its QoS and bandwidth requirements in view of the current, known network traffic. If insufficient resources are available, the connection request may be refused.

When modern services or protocols with heterogeneous characteristics and QoS expectations, such as non-deterministic IP packets and deterministic ATM cells, flow together in a network, and especially in single NEs, the QoS expectations of traffic carried by one service may often be impaired by traffic being simultaneously carried on other services. This may often be due to conflict for use of shared resources, e.g., buffers, fabric threads, communication links, scheduler service, and the like.

Current NEs generally are not able to adequately respond to such problems, principally because current switch fabric and router backplanes are designed for only one service or protocol. Often cell-based, ATM-like switching fabrics are used in IP routers to route and forward IP-only traffic within an NE from an input network port slot to an output network port. Similarly, the so-called multi-service NEs are also designed with ATM in mind so that data must be forwarded through the switch in ATM-like cells. This requires that incoming communication packets of other services or protocols, such as IP, be segmented as best as possible for transport through the switch in ATM cells and that the QoS classes of these other services be mapped as best as possible to ATM QoS classes. Further precautions may be needed to prevent ATM QoS goals from being compromised by competition from other services.

Without an adequate response to such problems, network operators often must pick one service as more important than the others (e.g., ATM more important than IP), regardless of the reality of changing user needs.

SUMMARY OF THE INVENTION

The present invention overcomes these problems by providing systems and methods for switches and routers that permit traffic carried on separate services or protocols to pass like "ships in the night", without performance compromise or other interference between the services or protocols. Even though multiple network protocols, each with its own QoS architecture and requirements, coexist on the same switch/router and, in some cases, on the same line cards, this invention provides an architecture for the data plane (backplane) of a network element (NE) that accommodates the quality-of-service (QoS) goals of each service. Thus, for example, over-subscription of ATM resources will not impair IP services. Although multi-service NEs are the preferred application of the scheduling and queuing architectures of this invention, it will be understood that these architectures have other useful applications. For example, they may be applied to single-service NEs, or to portions of an NE, or the like. Within an NE, they may be applied only to the line-card ingress blocks, or only to the line-card egress blocks, or only to selected line cards, or the like.

Switch and router fabrics generally transmit data in fabric data units (FDU) between line cards. In this invention, as described in the Variable-size FDU application, it is preferred that the FDUs be variably-sized with data payload sizes varying between a minimum (preferably one byte) and a user-chosen maximum size. For example, to handle ATM it is preferred that a single ATM cell can be carried in a single FDU. For an IP packet, the FDU is preferably sized so that the normal IP packet can be carried in a single FDU, with only larger packets needing segmentation into multiple FDUs. However, since these services are sharing common resources, the FDU size should be common to all services simultaneously using the backplane (e.g., IP and ATM). For instance, the FDU size can be set so that an ATM cell can be carried in one FDU. AN IP packet will have to be segmented in multiple FDUs if the IP packet size exceeds that of an FDU.

It is the ingress and egress blocks of the line cards that include scheduler functions and queuing systems according to the novel scheduling and queuing architecture of this invention. These system and functions work in concert transmission and receiving devices (interfaced to the switch backplane) that so that the switch/router NE provides the desired behavior including seamlessly handling a mix of services, such as IP and ATM, in a manner that satisfies their QoS goals. This scheduling and queuing architecture also handles both reserved and non-reserved traffic, where the connectionless-oriented IP services are representative of unreserved traffic and the connection-oriented ATM, FR and MPLS services (when reservation is exercised) are representative of reserved traffic. The term "reservation" is used herein to refer to an amount of bandwidth and/or other resources that are set aside for the use of a particular end-to-end network traffic flow. For example, reservations may be made of the bandwidth across the switch backplane between two line cards inside a single NE, or of the bandwidth across an external network link between two NEs, or of memory resources in an NE, or the like. Reservations are made during the connection setup process, which also determines the links and nodes that will be traversed by the flow.

This invention accommodates the QoS and other goals of a number of services by dividing bandwidth through a switch backplane between the line cards among services in a controlled manner that can preserve each service's relative QoS goals. The term "(network) service" is used here to refer to a network protocol for transporting data units through a network; examples of services include ATM, IP, FR, Ethernet, MPLS, and the like. Also, many network services define a number of QoS classes, each QoS class specifying goals (or requirements) for performance, such as throughput and delay, of packets or network flows assigned to that class. Additionally, this invention subdivides the bandwidth assigned to a particular service on the switch backplane between that service's QoS classes in a controlled manner that preserve these classes relative performance. This invention also includes finer subdivisions of backplane bandwidth, for example, between unicast and multicast flows with a particular QoS class of a particular network service. However, the divisions and subdivisions of this architecture are flexible, and for example, if restrictions exist on hardware resources and associated costs, certain QoS classes or even entire services can be combined into a single bandwidth subdivision but at the expense of losing isolation.

Citation or identification of any reference in this section or any section of this application shall not be construed so that such reference is available as prior art to the present invention. Similarly, description of the technological arts shall not be construed as an admission of the contents of the prior art.

BRIEF DESCRIPTION OF THE DRAWINGS

The present invention may be understood more fully by reference to the following detailed description of the preferred embodiments of the present invention, illustrative examples of specific embodiments of the invention, and the appended figures in which.

DETAILED DESCRIPTION OF THE PREFERRED EMBODIMENTS

In the following two subsections, IP and ATM QoS requirements are reviewed in order to provide better context for the backplane scheduler presented in this invention. It should be understood that application to switches and routers handling IP and ATM services is preferred but exemplary; the present invention is also applicable to switches and routers handling these and/or other network services.

Figure 1A:
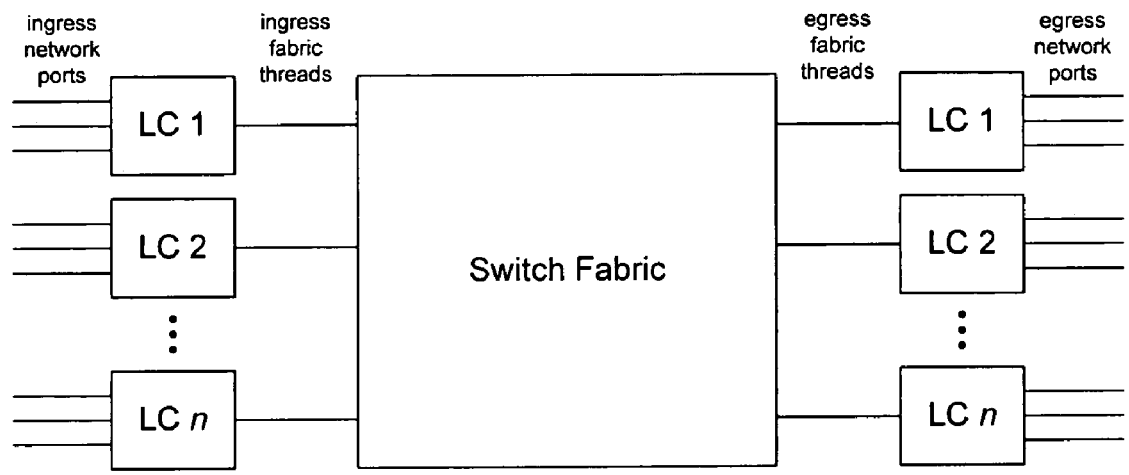
FIG. 1A-B illustrates an switch/router with switching fabric.
Figure 1B:
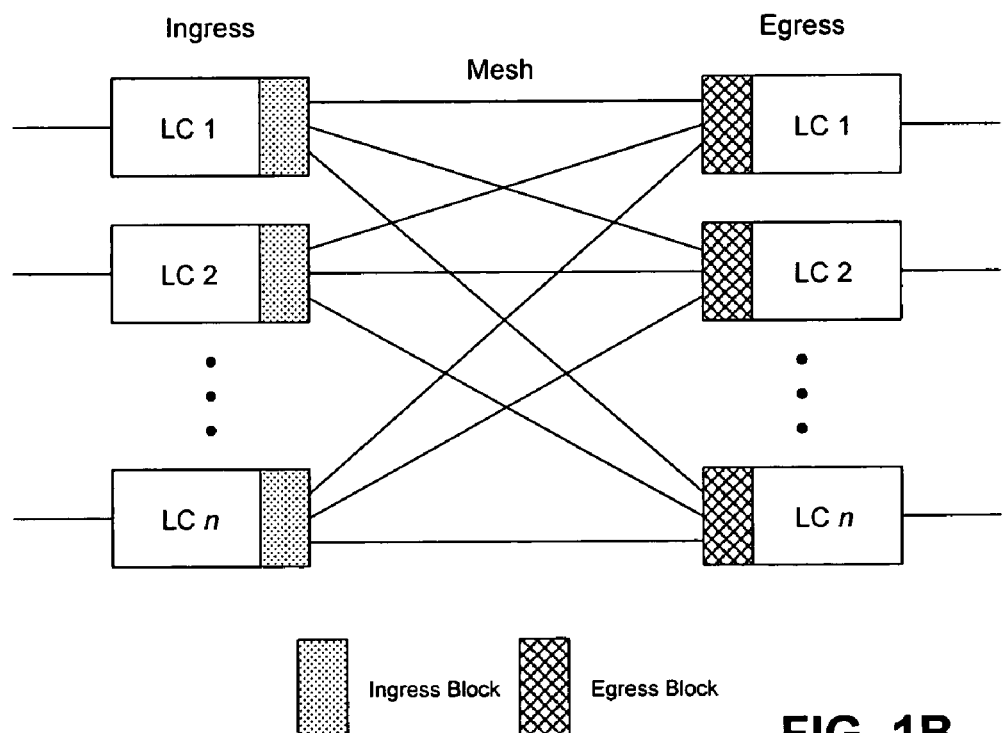

This invention is preferably applied in switches and routers with the preferred system architecture that is illustrated in FIG. 1A-B. FIG. 1A illustrates that such a preferred architecture includes a number (one or more) of line cards (LC 1-LC n) each with input and output ports (one or more) to network links (known as ingress network ports and egress network ports, respectively). The terms "ingress" and "egress" are used herein to refer to the direction of the traffic flow. The line cards are interconnected by a switch fabric to which they are linked by ingress and egress fabric threads. The term "thread" is used herein to refer to a preferably serial link that connects a line-card (occupying a slot in a NE) to the NE switch fabric or backplane.

FIG. 1B illustrates in more detail that each line card (LC 1-LC n) includes an ingress block with up to N ingress threads (N is the number of line cards in a system, the line cards typically being held in system slots) and/or an egress block also with up to N egress threads. These threads are capable of transmitting to all the line cards in the system (including self-connections) so that the backplane is preferably fully connected (known as a mesh backplane). It should be understood that the invention is also applicable to non-fully connected architectures. It should also be understood that this invention is applicable to other NE system architecture that may be, for example, only partially connected or connected via other types of switching fabrics, such as a dynamically configurable switching matrix. Such architectures include backplanes using single or multiple buses, shared memories, or so forth.

IP QoS Architecture and Requirements

IP networks are evolving from a one-class best-effort packet forwarding model into a multi-class packet service model in order to allow new applications with varying QoS requirements to be carried across IP networks. New QoS guarantees may involve delay bounds, jitter bounds, packet loss bounds, bandwidth assurances and service resiliency against outages and failures. QoS, class-scheduling, and buffer management for ATM and IP share similar principles and are expected to converge as both network services seek to offer voice, video, and data services Network elements (NE) in current and future IP QoS models should provide facilities for these new services, including, for example, differentiated services (DS), multi-protocol label switching (MPLS), QoS routing protocols, and other techniques. DS, being defined by the differentiated services working group in the Internet Engineering Task Force (IETF), differentiates among packets at nodes and links in the network by defining multiple per-hop-behaviors (PHBs) that define different packet treatments at each hop or each link. PHBs do not define end-end service behaviors as does ATM. Currently defined PHBs defined include expedited forwarding (EF), assured forwarding (AF), and best effort (BE) and are often implemented by mapping to a scheduling class or a queue at a NE. DS also allows network operators to define custom PHB's and also provides class selector code points for backward compatibility with legacy IP precedence and type of service (TOS). EF is for use in building virtual wire services that can carry voice and video application data with low delay, low jitter and low packet loss. AF defines four PHB groups that are to be used by multiple data services with per-class bandwidth guarantees and different packet drop characteristics. AF PHB groups are intended to receive their allocated resources.

ATM QoS Architecture and Requirements

ATM was initially designed with QoS classes to satisfy a broad range of application requirements. Current ATM QoS architecture provides mainly four classes of service: unspecified bit rate (UBR) with no bandwidth or QoS guarantees for best effort services; variable-bit rate non-real time (VBR-NRT) for bandwidth guarantees but no QoS guarantees intended for bursty traffic; variable-bit rate real-time (VBR-RT) with bandwidth and QoS guarantees (e.g., delay bound) for real-time applications with real-time requirements (e.g., video); and constant bit rate (CBR) with the strictest service guarantees for applications requiring sustained rate, low delay, low delay variation. In addition, the ATM guaranteed frame rate (GFR) class provides QoS and bandwidth guarantees at the AAL5 PDU level whereas ATM available bit rate (ABR) class provides feedback so that applications may adjust their data rates based on available bandwidth.

Generic Hierarchical Scheduler Text

Figure 2:
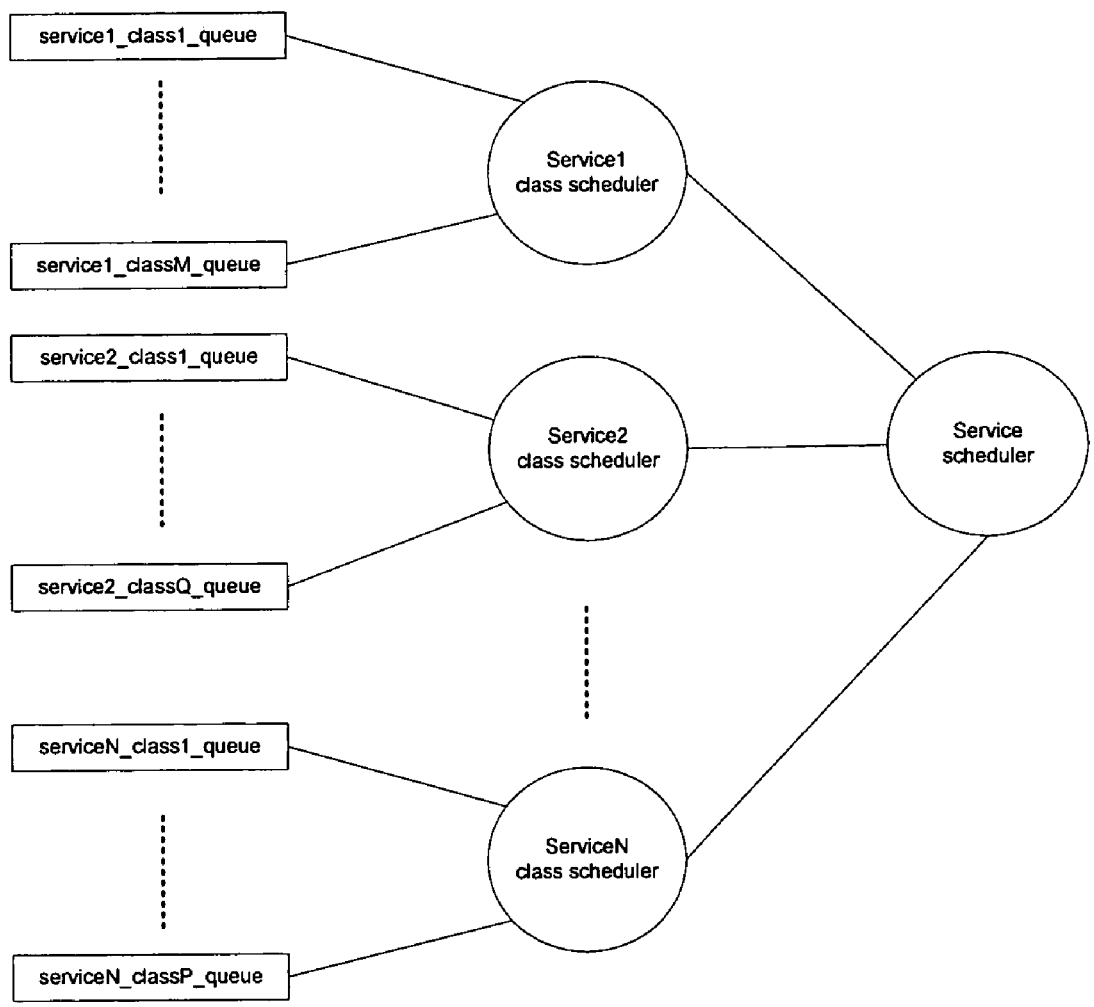
FIG. 2: illustrates an exemplary architecture of this invention.

FIG. 2 generally illustrates an exemplary scheduling and queuing architecture of this invention in an application where the network services and their QoS classes are fully-isolated. Here, the switch or router handles network services 1 to N, where service 1 has M QoS classes, service 2 has Q QoS classes, and service N has P QoS classes. Accordingly, as illustrated, this embodiment includes N groups of queues, one group of queues for each network service. The group of queues for a service having a sub-queue for each of that service's QoS classes. Using this queue structure, the bandwidth available to a particular service is sub-divided among its QoS classes by its class scheduler which selects FDUs (or cells, or frames, or generally network data units when the present invention is applied to network links) for transmission in a manner accommodating the relative QoS performance goals. Then, the total bandwidth across the switch backplane is divided among the service groups by the main scheduler which selects the next service for backplane transmission. Preferably, both the class and main schedulers are configurable so that service QoS characteristics and local operational requirements may be accommodated and traded-off.

Stated differently, FIG. 2 illustrates that the general hierarchical scheduler and queuing architecture of this invention queues data packets in a plurality of queues according to the characteristics of the data packets. Here, the packets are queued according to the network service and to the QoS class within network service to which they belong. Further the queues are arranged into hierarchically structured groups according to the characteristics of the queued packets. Each particular group of queues within the hierarchy has one or more dependent (in the hierarchical structure) sub-groups, where each queue of that group belongs to one sub-group. Of course, a particular group may have no sub-groups, in which case it is said to be a leaf of the hierarchy, or at the bottom level of the hierarchy, or the like. Further, each particular group is a sub-group of a superior group (in the hierarchical structure), unless of course, that group includes all queues and is thus at the root of the hierarchy, or at the top level of the hierarchy, or the like. In a different naming, a root group may be called a $1^{st}$ level group; its immediately inferior group may be called a $2^{nd}$ level group, and so forth up to the leaf group on the Nth level. All naming methods are intended to be merely descriptive. The queues hierarchy may have a general structure, for example a particular queue hierarchy need not be balanced; the number of levels between the root and each leaf need not be the same for all leaves.

FDUs are selected from these hierarchically arranged queues for transmission across the switch fabric by a scheduler hierarchically structured preferably similarly to the queue groups. Thus, there are first (or top) level schedulers, second level schedulers and so forth (collectively, intermediate level schedulers), and on up an Nth (or bottom) level scheduler. Using either predefined or configurable QoS, priority, and other scheduling characteristics of these groups, one queue from all queues will be selected from which its first queued packet (or FDU) will be allocated switch fabric resources and transmitted during a given transmission cycle. The selection process is described here as if it is performed in a top-down manner through the queue hierarchy. One of skill in the art will understand that this description is not limiting, and the various selections may be made with varying degrees of parallelism to lessen any time delay between switch fabric resources becoming available and commencement of transmission of the next packet. Now, using a top-down description, a service is selected by a first level scheduler. At the second level there will thus be one or more subgroup within the selected service to select from, and this selection is done by a second level scheduler, where there is one second level scheduler for each second level group. And so forth through any remaining intermediate level schedulers so that at the Nth level, the bottom level scheduler will select the next queue from which its first packet will be transmitted.

The individual schedulers in this hierarchy are preferably configurable. Generally and preferably, this invention employs two principle types of schedulers. One type, called strict priority scheduler, schedules among the queues of unequal priorities always selecting a non-empty queue with the highest priority, and selecting a queue with lower priority only if all the queues within the group with higher priority are empty. Another type, generally called a fair scheduler, selects a single queue among the queues based on the relative bandwidth of the queues, length of FDUs served from the queues, delays in selecting the same queues and other information. The fair schedulers' operation may vary from simple Round Robin to more complex implementations, Weighted Fair Queuing (WFQ), Deficient Round Robin (DRR), and others. A generic scheduler is a scheduler, which can assume any type of scheduling algorithm. Each scheduler of the hierarchy preferably selected according to the characteristics of the FDUs that it manages. In certain embodiments a fair scheduler which takes the length of FDUs in consideration of fairness is preferred. The example of such a scheduler is SEWDRR. Preferred schedulers are described in the SEWDRR application. SEWDRR is most suitable for services that share the same backplane and require variable size FDUs.

In an ingress line card with such hierarchical queues and schedulers, network data packets received from the input ports are queued onto appropriate queues, and the packet (or FDU) finally selected by the scheduler is output over a thread to the switch fabric. In an egress line card, packets (or FDUs) received from the threads linking the switch fabric are queued onto appropriate queues, and the packet finally selected by the scheduler is output over an output port.

FIG. 2 illustrates an exemplary and basic two-level scheduler hierarchy (useful for either an ingress or an egress line card). Here there are a plurality of leaf groups, one group for each network service where each queue in a leaf group is characterized by the QoS class within the network service. The top level group is the group of all queues with all the queues of all the sub-groups. Accordingly, there is a plurality of intermediate level schedulers, one for each network service which selects the next QoS class for a network service. And there is a single Nth level scheduler that selects a queue from among the selected QoS-class-within-network-service queues. The first packed from this last selected queues is transmitted next.

Embodiments of this invention can differ, first, in the network services they are designed to handle. Given a particular choice of network services, embodiments can also differ in the packet or cell characteristics used to define the queues. A more (or less) fine selection of packet characteristics usually results in a greater (or lesser) number of queues. Not only may the breadth (the total number of queues in the hierarchy) of the queue hierarchy vary but also its depth (the number of levels from the leaf groups to the root) and structure. Finally, embodiments can differ in the choice of types of schedulers and their configurability that are arranged in the scheduler hierarch. In a particular embodiment, these design choices may be fixed to meet the needs and requirements of the particular network application the embodiment will be serving.

In the following two particular embodiments of this invention will be described. Both handle ATM and IP services; they differ in the performance and QoS goals achieved.

Figure 3:
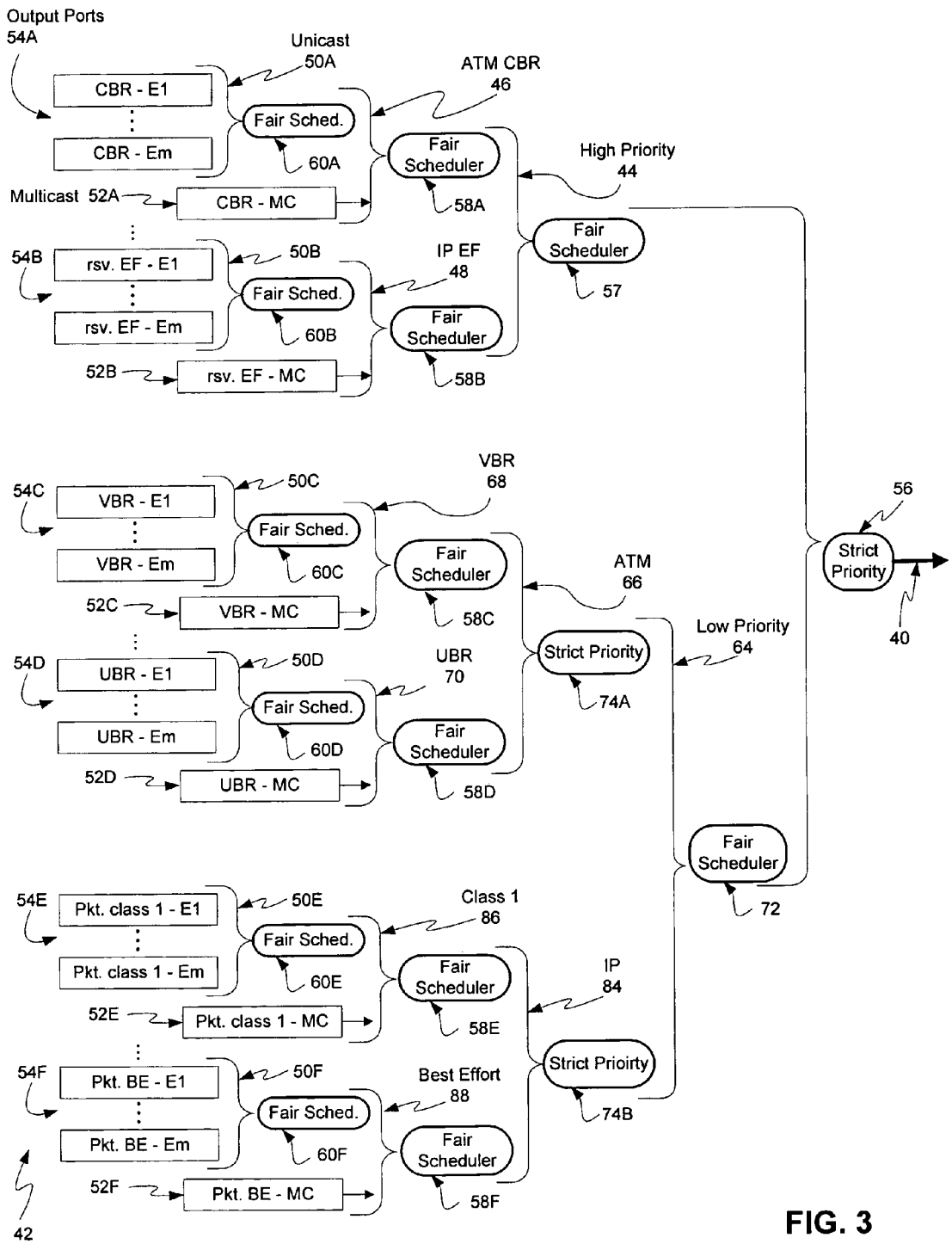
FIG. 3: illustrates a preferred embodiment of the scheduler for providing per service guarantees used on an ingress card.
Figure 4:
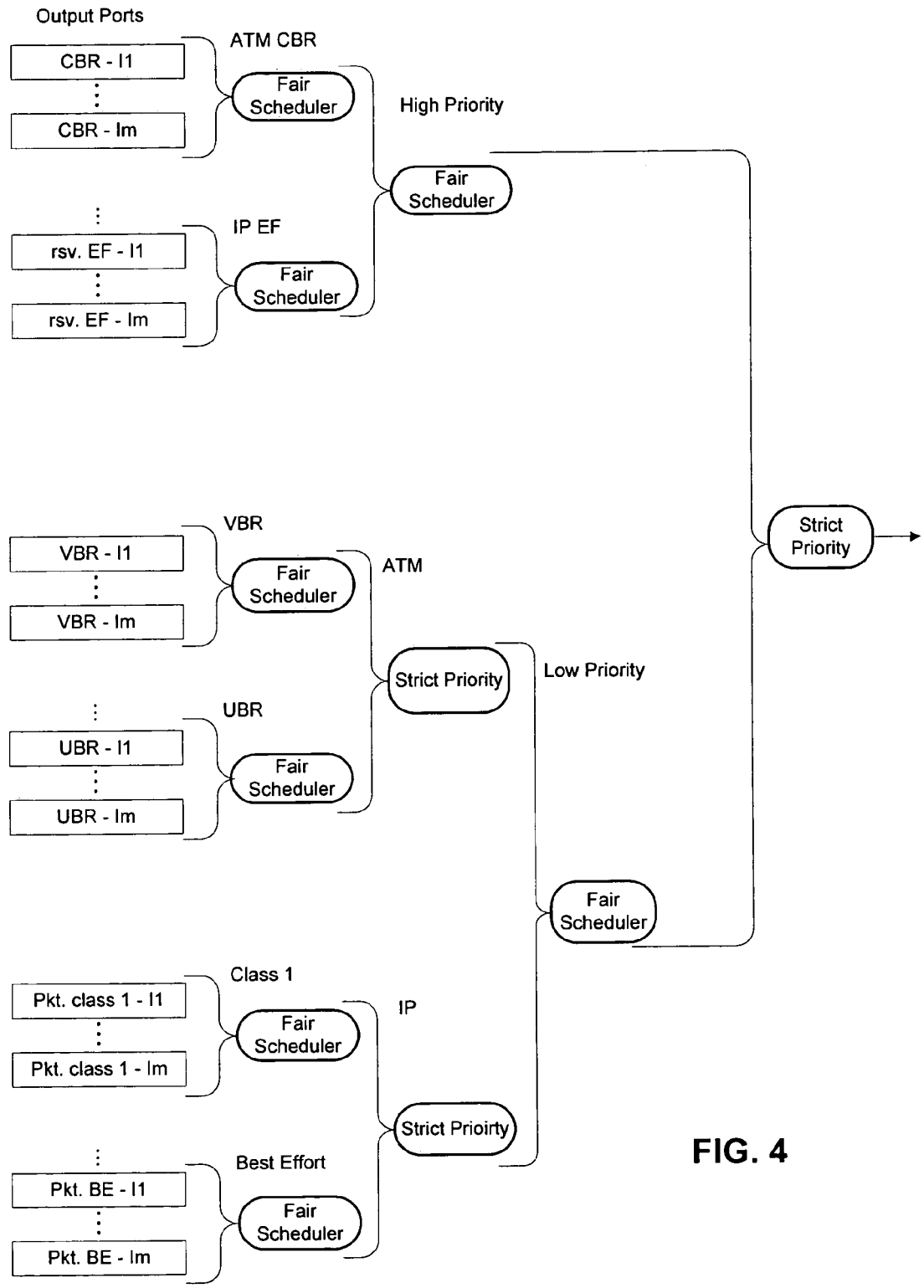
FIG. 4: illustrates a preferred embodiment of the scheduler for providing per service guarantees used on an egress card.

1st Preferred Embodiment—Generic Hierarchical Scheduler with Per-Service Guarantee FIGS. 3 and 4 illustrate an exemplary preferred queue and scheduler structures designed for more complex switches handling multiple protocols, here mixed Internet Protocol (IP) and Asynchronous Transfer Mode (ATM) traffic, at higher throughputs that provide per-service guarantees. FIG. 3 illustrates ingress card queue and scheduler structures. Generally, FDUs carrying segments of communication units (packets, cells, or frames) are selected for output 40 through the card's interface to a preferably fully-mesh-connected switch fabric by a plurality of hierarchically-organized schedulers that act jointly to select next FDUs and communication packets from a plurality of hierarchically-organized input queues. Here, and in other embodiments where the network service handled include fixed and variable sized network data units, the switch backplane preferably handles variable sized FDUs as described in the "Variable-size FDU" application.

FIG. 3 illustrates that ingress card input queues 42 are organized into principal groups so that packets with generally similar protocol characteristics compete together for switch resources. Group 44, labeled "High Priority Traffic", is for traffic with a high protocol-defined priority such as ATM Constant Bit Rate (CBR) packets and IP reserved Expedited Flow (rsv. EF) packets designated as high priority. Even though this traffic combines fixed-size ATM cells with variable-size IP packets, it is nevertheless grouped because its packets all share high priority. This high priority group is divided into QoS sub-groups: ATM CBR 46, and IP Expedited Flow (EF), 48.

The remainder of the queues are in low priority, group 64. Low priority group is further divided into ATM sub-group 66, and IP sub-group 84. These sub-groups are further subdivided into QoS classes specific to each service. The ATM queues are divided into the QoS sub-groups: Variable Bit Rate (VBR-rt and VBR-rt) 68, Unspecified Bit Rate (UBR) 70, etc. The IP group is similarly divided into the IP QoS sub-groups, such as "Packet Class 1 (or 2 or 3)" 86 packets and Best Effort (BE) packets 88.

Further, both the high and low priority groups are divided into unicast sub-groups 50A-F, for unicast network data units, and multicast sub-groups 52A-F, for multicast network data units. All unicast groups are further divided into output thread sub-groups 54A-F, one such queue for each egress card output thread (E1-Em). The Multicast queues are not so sub-grouped (since they are usually directed to multiple egress card threads).

FIG. 3 also illustrates that a strict priority scheduler 56 selects between queues selected from the high priority and the low priority groups. Therefore, if one of the queues in the high priority group is non-empty, it will be selected. If all the queues of high priority are empty, a queue from the low priority group is selected. In detail for low priority group scheduling, a fair scheduler 72 (preferably deficit round robin (DRR) or a variant of weighted fair queuing (WFQ)) will select between the network service (ATM or IP) sub-groups. Within the network service sub-groups, a strict priority scheduler 74A for ATM and 74B for IP will select a QoS group within that network service. Therefore, a higher priority non-empty QoS group will be selected prior to a low priority QoS group. Next, a fair scheduler 58C-F will select between the unicast and the sub-multicast groups within a selected QoS group. If the multicast group, with a single queue, is selected (provided the queue is non-empty) the hierarchical scheduler performs the processing as described in Multicast Application. If the unicast group is selected, fair schedulers 60A-F will select a non-empty queue associated with one of the egress-card output threads.

If the strict priority scheduler 56 selected the high priority group, a fair scheduler 57 would select between its QoS sub-groups. The remainder of the high priority group scheduling process is similar to that for the low priority group. The present description of the scheduling process proceeds top-down through the hierarchy. It is to be understood that this is not limiting and an actual scheduling process may proceed from bottom-up, or with various degrees of parallelism, or the like Next, FIG. 4 illustrates per-service guarantee queuing and scheduling hierarchy on an egress card. The principal difference from the ingress queuing and scheduling hierarchy is that, while the ingress card has queues (within network service and within QoS class) for the egress card threads (E1-Em), egress card has queues (within network service and within QoS class) for the ingress card threads (I1-Im). Accordingly, the high level scheduler on the egress card selected queues representing packets received from particular ingress threads. Also generally, multicast queues need not be provided unless resources permit. If multicast queues are provided, then separate flow control (also called backpressure assertion) for multicast and unicast services is possible.

2nd Preferred Embodiment—Generic Hierarchical Scheduler with Per-Port Guarantee

Figure 5:
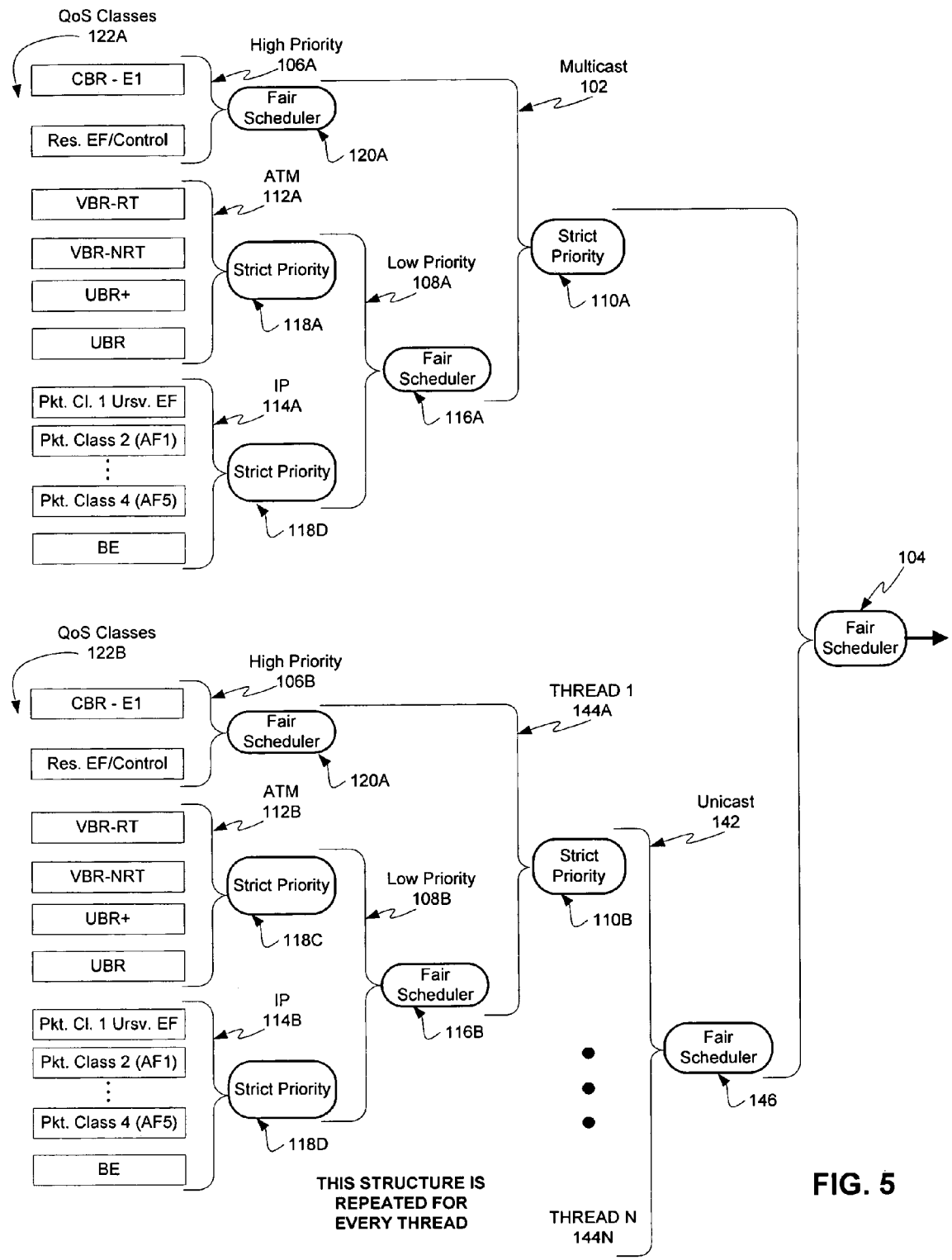
FIG. 5: illustrates another preferred embodiment of the scheduler for providing per thread guarantees used on an ingress card.

FIG. 5 represents another preferred embodiment of the hierarchical scheduler with per-thread bandwidth guarantees for implementation in ingress cards. Here, low priority traffic from a first ingress thread can be scheduled before higher priority traffic from a second ingress thread in order that the first thread's bandwidth guarantees be met. However, within traffic arriving at a single thread, priority as well as bandwidth division is, as explained for the first preferred embodiment, according to network service and to QoS class within a network service.

In this embodiment, the hierarchy of the groups into which the queues are assigned differs from the first preferred embodiment in order to achieve the differing performance goals. On the highest level, the queues are sub-grouped into either a sub-group of unicast queues 142 or a sub-group of multicast queues 102, and these two sub-groups are scheduled by a fair scheduler 104. On the next level, in the unicast group, the queues are grouped into sub-groups per (physical or virtual) output threads 144A-N, and these sub-groups are scheduled by a fair scheduler 146. This next level is absent from the multicast sub-group, it is the nature of multicast that each multicast packet may be sent to a different set of output threads.

On the third level from the root, the queues of both unicast and multicast sub-groups are further sub-grouped into either high priority 106A-B or low priority 108A-B sub-groups. In the illustrated embodiment ATM CBR and IP Reserved EF traffic are high priority and the rest of the classes are low priority. A strict priority scheduler 110A-B schedules the different priority sub-groups in the multicast and the unicast groups. On the next level from the root, the low priority traffic is sub-grouped into according to network service (i.e., ATM or IP), as illustrated by the ATM sub-groups 112A-B and the IP sub-groups 114A-B. These service sub-groups are scheduled by the fair scheduler 116A-B. Finally, at the lowest level, the queues 122A-B are sub-grouped according to QoS classes, and scheduled by strict priority scheduler 118A-D in the low priority group and by fair scheduler 120A-B for the high priority group.

Figure 6:
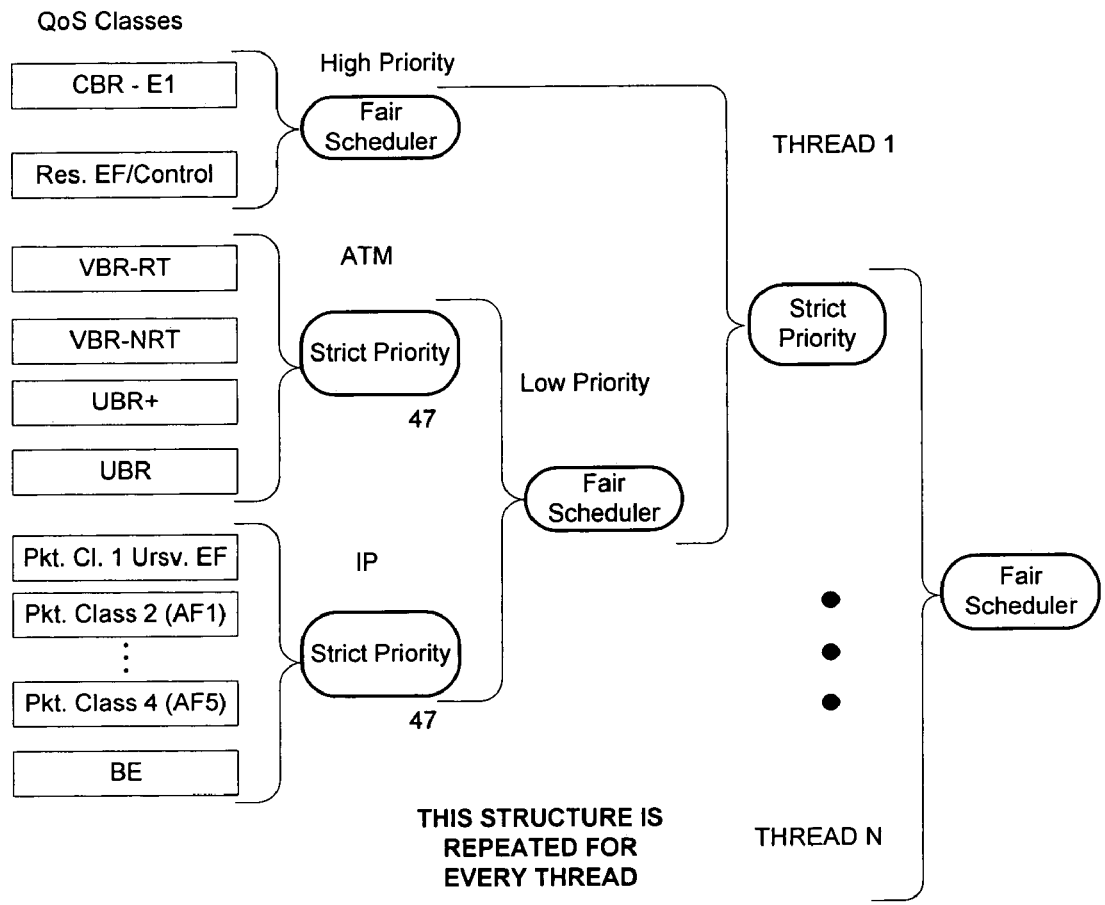
FIG. 6: illustrates another preferred embodiment of the scheduler for providing per thread guarantees used on an egress card.

FIG. 6 depicts this preferred embodiment as implemented in egress cards. The queuing and scheduling hierarchy is similar to that for the ingress cards except that the multicast/unicast sub-groups are not present. The absence of multicast/unicast sub-groups on the egress cards is similar to the first preferred embodiment described above.

This invention has certain additional aspects. It is generally preferred to isolate network data units of different services and QoS classes per thread. When an egress card cannot accept data units of one QoS class from an ingress card due to congestion, flow control signals may block such data units on the corresponding ingress line card. Other traffic to that egress card or from other ingress cards, however, could be still switched or transmitted. It is also generally possible to assign priorities to the network service, so that for example IP traffic will be always preempted by ATM traffic.

Although, the complexity of this invention may be somewhat higher than that of other known schedulers used in switching fabrics, its operations need not be centralized, but may be distributed among the line cards, especially in the case of the preferred mesh switch fabric, making it practically and efficiently implementable at high data rates.

Also, the scheduler of this invention can degenerate to a single-service scheduler and properly handle traffic of a single network service. When only ATM traffic is present, the queues of other services will be empty, and since all the schedulers are work-conserving (in other words, they serve only non-empty queues using all the available bandwidth without being limited to a queue allocated bandwidth) only ATM traffic will be served. The invention naturally acts as an ATM-only scheduler in this case. Similarly, if only IP traffic is present, the invention naturally acts as an IP-only scheduler. When a line card is intended for one service, the logic related to all other services can be easily depopulated to conserve hardware resources.

A preferred scheduling and queuing architecture for implementing these goals generally includes a group of queues for one or more network services, where each queue in a group of queues handles one or more QoS classes of the one or more network services. In a fully isolated embodiment, each network service would have its own group of queues and each QoS class of that service would have its own queue in that service group. A useful variation of the fully isolated embodiment combines in one group, for example, the QoS classes with the important or demanding characteristics from a set of services, while the remaining groups of queues are for QoS classes from this set and other services.

Using such a queue structure, the bandwidth available to a particular service, or more generally group of queues, is sub-divided among its QoS classes, or again more generally among the queues in the group, by a class scheduler which selects packets (or cells or frames of generally network data units, and in the case of the backplane an FDU) for transmission in a manner accommodating the relative performance goals of the queues. Then the total bandwidth across the switch backplane is divided among the service classes, or groups of queues, by a main scheduler which selects the service from which the next FDU is in turn selected for backplane transmission across a particular thread. Preferably, both the class schedulers, main schedulers, and other schedulers in an architecture are configurable so that service QoS characteristics and local operational requirements may be accommodated and traded-off.

In similar variants of the invention, certain services may be combined into a single group of queues, or a single service may be handled by two separate groups of queues. Similarly, QoS classes may be combined or sub-divided. Also, the class and main schedulers may include internal scheduler hierarchies. For example, QoS classes of a service with reserved resources (or with multicast packets) may be scheduled by a first sub-scheduler, while the QoS classes without reserved resources may be scheduled by a second sub-scheduler. In this variant, data units are selected by the sub-schedulers for transmission.

Further, buffer memory may be handled similar to backplane bandwidth. Different services may have isolated buffer pools, similarly different QoS classes within a service may have isolated buffer pools. Thereby, flow control within a switch or router may be handled on per service, or per QoS class within each service, or the like. Such flow control includes backpressure from an egress line card to the ingress line cards. Further, this architecture can gracefully handle a single service, such as IP only or ATM only, with only minor adaptation. This reduces the cost of having two different scheduler designs for the two traffic types and allows a single line-card to offer either a mixture of IP and ATM services or only a single service as if designed for that service only.

For a particular example where the services are IP and ATM, this scheduling and queuing architecture divides the backplane bandwidth among IP and ATM traffics simultaneously, and also among QoS class traffics within the IP and ATM services simultaneously. In contrast, most current multi-service NEs employ cell-based switching fabrics that do not distinguish network services, permitting performance distinctions only among QoS classes within one network service. Further, it is common that in an ATM switch with an cell-based ATM fabric, IP traffic, or other non-ATM traffic, is mapped to ATM classes and cells regardless of the fit between IP and ATM QoS classes and without resource isolation between these services.

In a further embodiment, this invention provides line-card-to-line-card bandwidth guarantees along with QoS class-based service priority between each line card pair. Thus traffic from one line card to a particular line card will not be affected by traffics from other line-cards to that line-card. In this embodiment, the interaction between traffic from different line-cards will be minimized. This facility is useful when bandwidth capacity on different line-cards is sold to different customers and must be isolated. In yet further embodiment, the scheduler provides class-based priority service and bandwidth guarantee within a class between line cards, thus preserving class-level priority. Within a class, bandwidth can be shared across threads in a weighted manner based on manual configuration or dynamic reservations. In this embodiment, high-priority traffic from one slot can completely preempt lower priority traffic from another slot. In an additional embodiment, this invention allows sharing of queues and resources of one connection oriented service by the reserved packet traffic of another service. This is a useful because connection-oriented frame services (MPLS or FR) and connectionless-services (IP) can be offered on the same line cards with service isolation.

The invention described and claimed herein is not to be limited in scope by the preferred embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

A number of references are cited herein, the entire disclosures of which are incorporated herein, in their entirety, by reference for all purposes. Further, none of these references, regardless of how characterized above, is admitted as prior to the invention of the subject matter claimed herein.

We claim:
1. A system for switching and/or routing of data units comprising:
 a. one or more ingress line cards, at least one of which comprises a memory for storing a plurality of data units received from one or more input ports and arranged into a plurality of input queues according to their characteristics, the input queues being arranged in a plurality of hierarchically structured groups of queues, the groups comprising:
  i. one or more service groups, one group for each network service,
  ii. one or more QoS groups within each service group, one QoS group for each QoS class of the network service,
  iii. a multicast group within each QoS group, the multicast group comprising multicast data units of that QoS group of that network service, and
  iv. one or more output thread groups within each QoS group within each network service group, each output thread group having a single queue of unicast data units all destined for a single system output port,
 b. one or more egress line cards, each egress line card associated with one or more output threads,
 c. a switching fabric interconnecting the ingress line cards with the egress line cards, and
 d. one or more control units for
  i. repeatedly selecting an input queue in the memory of at least one ingress line card, and
  ii. sending a data unit from the selected queue across the switch fabric to an egress line card.

2. The system of claim 1 wherein all queues of each QoS group are assigned either a high priority or a low priority.

3. The system of claim 2 wherein a high priority non-empty queue is selected before any low priority queue.

4. The system of claim 1 where the network services comprise IP with standard IP QoS classes.

5. The system of claim 1 where the network services comprise ATM with standard ATM QoS classes.

6. The system of claim 1 wherein at least one ingress line card comprises a control unit which repeatedly selects an input queue and sends a data unit from the selected input queue.

7. The system of claim 1 wherein repeatedly selecting further comprises in any order the steps of:
 a. using a fair scheduler to choose a service group from the one or more service groups,
 b. using a strict priority scheduler to choose single QoS groups from the one or more QoS groups within the service groups,
 c. using a fair scheduler to choose either the single multicast group or a single output thread group from the QoS groups within the service groups, wherein a fair scheduler is used to choose single output thread groups from the one or more output thread groups within the QoS groups within the service groups.

8. The system of claim 1 wherein at least one egress line card further comprises a memory for storing a plurality of data units received from the switch fabric and arranged into a plurality of output queues according to their characteristics, the output queues being arranged in a plurality of hierarchically structured groups of queues, the groups comprising:
 a. one or more service groups, one group for each network service,
 b. one or more QoS groups within each service group, one QoS group for each QoS class of the network service, c. one or more input thread groups within each QoS group within each network service group, one input thread group for each input thread, wherein each input thread group includes a single queue.

9. The system of claim 8 wherein all queues of each QoS group are assigned either a high priority or a low priority.

10. The system of claim 9 wherein a high priority non-empty queue is selected before any low priority queue.

11. The system of claim 8 wherein at least one egress line card comprises a control processing unit for repeatedly selecting an output queue and for transmitting a data unit from the selected output queue over an output port, wherein repeatedly selecting further comprises in any order the steps of:
  a. using a fair scheduler to choose a service group from one or more service groups;
  b. using a strict priority scheduler to choose single QoS groups from the one or more QoS group within the service groups;
  c. using a fair scheduler to choose single input thread groups from one or more input thread groups within the selected QoS groups within the service groups.

12. A system for switching and/or routing of data units comprising:
  a. one or more ingress line cards, at least one of which comprises a memory for storing a plurality of data units received from one or more input threads and arranged into a plurality of input queues according to their characteristics, the input queues being arranged in a plurality of hierarchically structured groups of queues, the groups comprising:
    i. one unicast group and one multicast group
    ii. one or more output thread groups within the unicast group, one output thread group for each output thread
    iii. one or more service groups within each output thread group and within the multicast group, one service group for each network service,
    iv. one or more QoS groups within each service group, one QoS group for each QoS class of the network service, wherein each QoS group includes a single output queue,
  b. one or more egress line cards, each egress line card associated with one or more output threads,
  c. a switching fabric interconnecting the ingress line cards with the egress line cards, and
  d. one or more control units for
    i. repeatedly selecting an input queue in the memory of at least one ingress line card, and
    ii. sending a data unit from the selected queue across the switch fabric to an egress line card.

13. The system of claim 12 wherein a data unit is segmented into one or more fabric data units (FDU) prior to storing it on an input queue, wherein an FDU is the unit of data sent across the switch fabric.

14. The system of claim 12 wherein all queues of each QoS group are assigned either a high priority or a low priority.

15. The system of claim 12 wherein a high priority non-empty queue is selected before any low priority queue.

16. The system of claim 12 where the network services comprise IP with standard IP QoS classes.

17. The system of claim 12 where the network services comprise ATM with standard ATM QoS classes.

18. The system of claim 12 wherein at least one ingress line card comprises a control unit which repeatedly selects an input queue and sends a data unit from the selected input queue.

19. The system of claim 12 wherein repeatedly selecting further comprises in any order the steps of:
  a. using a fair scheduler to choose either the unicast group or the multicast group;
  b. using a fair scheduler to choose single output threads group from the one or more output thread groups within the unicast group,
  c. using a fair scheduler to choose single service groups from the one or more service groups within the output thread groups or within the multicast group;
  d. using strict priority scheduler to choose single QoS groups from the one or more QoS groups within the service groups.

20. The system of claim 12 wherein at least one egress line card further comprises a memory for storing a plurality of data units received from the switch fabric and arranged into a plurality of output queues according to their characteristics, the output queues being arranged in a plurality of hierarchically structured groups of queues, the groups comprising:
  a. one or more input thread groups, one input thread group for each input thread,
  b. one or more service groups within each input thread group, one service group for each network service,
  c. one or more QoS groups within each service group within each input thread group, one QoS group for each QoS class of the network service, wherein each QoS group includes a single output queue.

21. The system of claim 20 wherein the single queue of each QoS group is a assigned either a high priority or a low priority.

22. The system of claim 20 wherein a high priority non-empty queue is selected before any low priority queue.

23. A system for switching and/or routing of data units comprising
  a. one or more ingress line cards comprising
    i. one or more input threads, and
    ii. a memory for storing a plurality of data units received from the input threads, the stored data units being segmented into fabric data units (FDUs) and arranged into a plurality of input queues according to their characteristics, the input queues being arranged in a plurality of hierarchically structured groups of input queues;
  b. one or more egress line cards comprising one or more output threads;
  c. one or more control units for
    i. selecting an input queue in the memory of at least one ingress line card, and
    ii. sending an Fabric data units from the selected queue to an egress line card.

24. The system of claim 23 wherein at least one ingress line card comprises a control unit for repeatedly
  a. selecting an input queue belonging to all of a nested set of groups of input queues, wherein the nested sets are repeatedly chosen from the hierarchical arrangement of groups by using one or more schedulers, and
  b. sending an FDU from the selected input queue across the switch fabric.

25. The system of claim 23 further comprising:
  a. one or more egress line cards comprising
    i. one or more output threads, and ii. a memory for storing a plurality of data units received from the switch fabric, the stored data units being arranged into a plurality of output queues according to their characteristics, the output queues being arranged in a plurality of hierarchically structured groups of queues;

b. one or more control units for
   i. selecting an output queue in the memory of at least one egress line card, and
   ii. transmitting a data unit from the selected queue to an output thread.

26. The system of claim 25 wherein at least one egress line card comprises a control unit for repeatedly
   a. selecting an output queue belonging to all of a nested set of groups of output queues, wherein the nested sets are repeatedly chosen from the hierarchical arrangement of groups by using one or more schedulers, and
   b. sending a data unit from the selected output queue to an output port.

* * * * *